US012352729B2

(12) United States Patent
Ghasabyan et al.

(10) Patent No.: US 12,352,729 B2
(45) Date of Patent: Jul. 8, 2025

(54) CONFIGURABLE MATERIALS TESTING

(71) Applicant: ROBUST AND FLEXIBLE ADVANCED SOLUTIONS INC., Sun Valley, CA (US)

(72) Inventors: Rafayel Ghasabyan, Yerevan (AM); Arev Hambardzumyan, Yerevan (AM); Vahe Momjyan, Yerevan (AM)

(73) Assignee: TACTUN, INC., Sun Valley, CA (US)

( * ) Notice: Subject to any disclaimer, the term of this patent is extended or adjusted under 35 U.S.C. 154(b) by 0 days.

(21) Appl. No.: 18/126,500

(22) Filed: Mar. 27, 2023

(65) Prior Publication Data
US 2024/0328913 A1  Oct. 3, 2024

(51) Int. Cl.
*G01N 3/06* (2006.01)
(52) U.S. Cl.
CPC ..... *G01N 3/068* (2013.01); *G01N 2203/0032* (2013.01); *G01N 2203/0204* (2013.01); *G01N 2203/0222* (2013.01)
(58) Field of Classification Search
CPC ........... G01N 3/068; G01N 2203/0032; G01N 2203/0204; G01N 2203/0222
USPC .......................................................... 73/800
See application file for complete search history.

(56) References Cited

U.S. PATENT DOCUMENTS

| | | | |
|---|---|---|---|
| 11,016,471 B2 * | 5/2021 | Stichling | G06F 30/00 |
| 2009/0307763 A1 * | 12/2009 | Rawlins | G06F 11/2294 |
| | | | 714/E11.002 |
| 2013/0219218 A1 * | 8/2013 | Frenz | G06F 11/3664 |
| | | | 714/27 |
| 2014/0236527 A1 * | 8/2014 | Chan | G01R 31/318307 |
| | | | 702/119 |
| 2020/0173893 A1 * | 6/2020 | Peterson | G01N 3/08 |
| 2021/0103262 A1 * | 4/2021 | Naidoo | G06F 11/3664 |
| 2021/0333182 A1 * | 10/2021 | Sato | G01N 3/08 |
| 2021/0364399 A1 * | 11/2021 | Wang | G01N 3/06 |
| 2022/0107247 A1 * | 4/2022 | Kirby | G01N 3/02 |
| 2022/0170833 A1 * | 6/2022 | Mouri | G01N 3/068 |
| 2022/0381660 A1 * | 12/2022 | Riddick | G01N 3/068 |
| 2024/0280599 A1 * | 8/2024 | Morse | G01N 35/00732 |

FOREIGN PATENT DOCUMENTS

| | | | |
|---|---|---|---|
| JP | H0943124 A | * 2/1997 | |
| JP | 3442279 B2 | * 9/2003 | |
| WO | WO-2019152011 A1 | * 8/2019 | G01N 3/02 |

* cited by examiner

*Primary Examiner* — Marrit Eyassu
(74) *Attorney, Agent, or Firm* — ARLUYS IP, P.C.

(57) ABSTRACT

Techniques are described for configuring a materials test system to perform materials tests on sample material(s). Such a materials test system may include a test controller and materials test device(s), which are connected to the test controller. In an embodiment, the materials test system receives input selecting a test controller type for the test controller of the materials test system and input for configuring a materials test device. Without the materials test system being connected with the test controller and the materials test device, generating configuration data based on the inputs. The generated configuration data may be loaded into the test controller, thereby configuring the materials test system.

20 Claims, 9 Drawing Sheets

CONFIGURABLE MATERIALS TESTING

FIELD OF THE TECHNOLOGY

The present invention relates to the field of materials testing, in particular, to highly configurable materials testing.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Materials testing involves complex materials testing devices that include mechanical machinery configured and controlled by one or more computing devices referred to herein as controllers. The configuration and control of the materials testing are driven by industry standards (ISO, ASTM, etc.); each of such standards corresponds to testing a particular material and/or the type and quality thereof. There are thousands, if not 10's of thousands different standards, each describing a different testing procedure and measurements for conformance to the standard.

Such a variety of tests requires even a greater variety of control logic to perform the tests, including providing inputs to materials testing devices, collecting inputs from a variety of sensors, and performing various calculations/processing to determine conformance. Accordingly, for a new materials test, a new control logic may be required and, therefore, a new development effort to properly program the control logic to perform the materials test. Similarly, a new materials test device or even a new sensor on a materials test device may require new logic on the controller. Therefore, again, the materials test controller may require further development effort to properly program the control logic.

Sometimes, even simple customization of a test or a report may require a new development effort for new programming logic. For example, when a new control logic is deployed, or a new algorithm for calculating test results that was not previously programmed into the controller is required, the existing program logic of the controller may have to be re-developed to accommodate accordingly.

Furthermore, a new test may require better accuracy/speed in measurement or calculation. In such an example, a change in controller hardware may be required to control the materials test device with the new accuracy/speed.

Additionally, the materials testing may be configured, performed and analyzed using a variety of configurations that may be in addition to the requirements of the standards but yet important for the robust and successful performance of the materials testing. Examples that require a change in configuration may include changing the units of measurement for sensors, or adding or removing a monitoring camera for recording, or adding/removing/changing permissions for users that configure/perform/analyze materials testing. These and other additional features of the materials testing require custom configurations, which may be costly and sometimes even impossible on the dedicated materials test systems. This issue is further aggravated due the changing requirements mandated by the regulations to which the materials test systems have to comply.

BRIEF DESCRIPTION OF THE DRAWINGS

In the drawings of certain embodiments in which like reference numerals refer to corresponding parts throughout the figures.

DETAILED DESCRIPTION

Figure 1A:
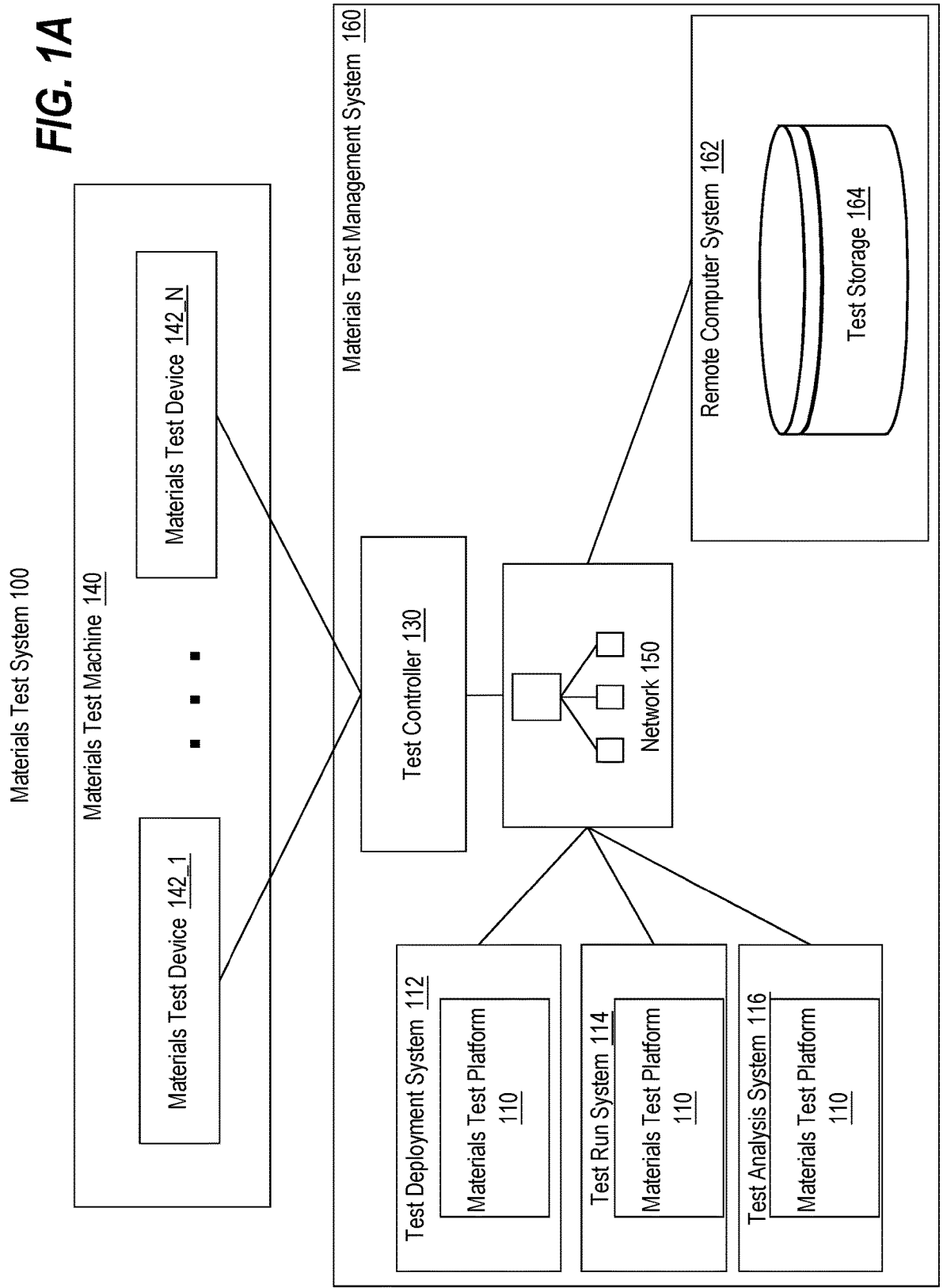
FIG. 1A is a block diagram that depicts a materials test system (MTS), in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe a materials test platform (MTP) that provides an interface for the configuration, administration, performance and/or analysis of materials testing. MTP may be configured to run materials testing on a variety of materials test machines (MTM) controlled by materials test controllers (referred to as "controller" hereafter). Through MTP, configuration data is generated for controller(s) to configure themselves as well as MTM(s). In an embodiment, MTP may receive an input to configure the controller type of the controller that is or will be coupled to MTM to manage MTM and the materials testing thereof. In an embodiment, the configuration of the MTM depends on the selected controller type, and different machine configuration data is generated for each controller type.

Such a configuration may be performed irrespective of MTP being communicatively coupled to a controller being configured. Stated differently, MTP may perform the configuration of an MTM without any communication with the MTM or the controller. Once communicatively coupled, the generated configuration data is loaded into the controller, configuring the controller to further configure MTM and its materials test device(s).

In an embodiment, MTP provides a variety of configuration settings for various materials test devices that are part of an MTM. The MTP receives input that configures the materials test devices of the MTM with a set of configuration setting values, thereby generating machine config data for the MTM. In an embodiment, configuration setting(s) of a materials testing device may depend on the configuration setting value of a different configuration setting. The different configuration settings may be that of another/same materials test device, controller, or the materials test itself. For example, configuring a measurement unit configuration setting value for an MTM may change the available values for configuring a measurement sensor configuration setting.

In an embodiment, an MTP may provide a configuration for multiple type MTMs, each represented by separate machine config data. Accordingly, an MTP may receive user input for configuring multiple types of MTMs and thereby generating multiple machine config data.

Additionally or alternatively, the input to select machine config data and other config data may indicate a remote server to MTP as the source for configuration. The remote server is reachable through the network by the controller (e.g., a cloud server, edge server, or local storage server). In such an embodiment, the data is requested to be downloaded on the controller, and once downloaded, the controller and MTM are configured according to the downloaded data. The configuration setting data stored on the remote server may have been configured and uploaded to the remote server for storage by an instance of MTP running locally or on the remote server.

Additionally or alternatively, MTP provides an interface for user configuration of the MTM during the deployment. When deployed, MTP may configure MTM and/or the controller to address any mismatch in configuration or update the deployed configuration while at least the controller is communicatively coupled to MTP. The controller may itself apply at least a portion of the configuration settings and process requests for the MTM based on the applied configuration settings.

After loading Machine Configuration Data 222 into the controller that is communicatively coupled to the MTM, the controller is configured to manage and control the performance of materials testing by the MTM. Based on the configuration with the machine configuration setting data, the controller may receive materials test result data from the MTM for further analysis and report by MTP. Similarly, the controller may provide corresponding signals (and other control data), which may be provided by MTP, to the MTM for controlling and thereby performing the materials testing and collecting the test results.

System Overview

FIG. 1A is a block diagram that depicts Materials Test System (MTS) 100, in one or more embodiments. Materials Test System 100 includes Materials Test Management System 120 and Materials Test Machine 140. Materials Test Machine 140 is a hardware machine (that may include software component(s)) that performs one or more destructive and/or non-destructive materials test(s) on sample material, in an embodiment. Materials Test Machine 140 includes one or more Materials Test Devices 142_1-142_N, where the letter "N" indicates the number of the materials test device(s) in Materials Test Machine 140. Each of Materials Test Devices 142_1-142_N performs one or more functions in the administration of a materials test and collecting information resulting from the performance of the test on sample material(s). Non-limiting examples of Materials Test Devices 142_1-142_N are an actuator for applying force on a sample, sensors for measuring the generated movement and various effects of the force application, and various safety devices.

In an embodiment, Materials Test Management System 120 manages Materials Test Machine 140, including deploying, provisioning, and configuring Materials Test Machine 140 and its Materials Test Devices 142_1-142_N. Materials Test Management System 120 may configure the test(s) to be performed on sample material(s) and collect/analyze the results of the tests. Materials Test Management System 120 interfaces with Materials Test Machine 140 through Test Controller 130. Test Controller 130 manages the performance of the test(s) by Materials Test Machine 140.

Figure 1B:
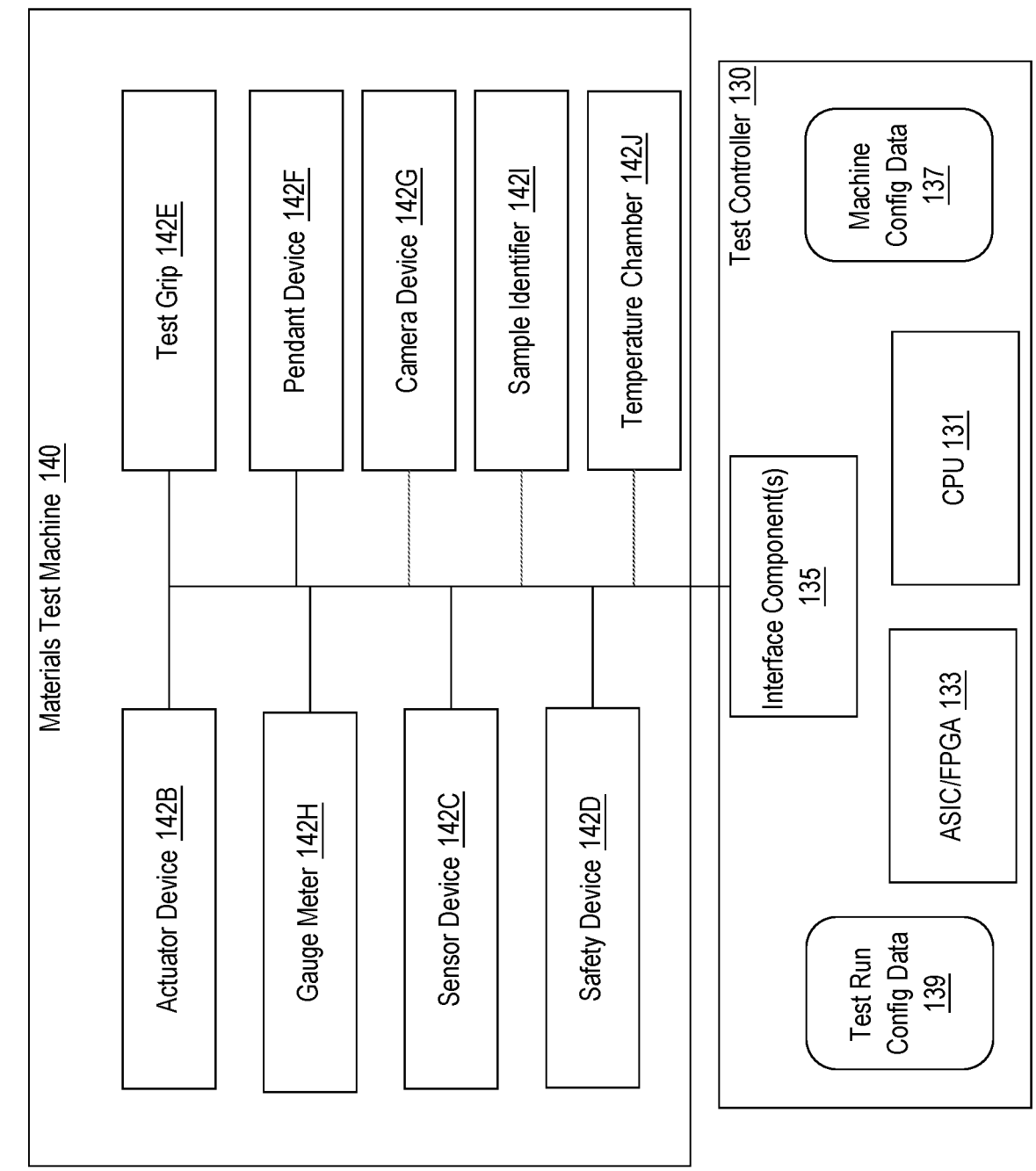
FIG. 1B is a block diagram that depicts a test controller interfacing with a materials test machine, in an embodiment.

FIG. 1B is a block diagram that depicts Test Controller 130 interfacing with Materials Test Machine 140, in an embodiment. In one embodiment, Test Controller 130 may use CPU 131 to execute test-related functions. CPU 131 may receive Machine Config Data 137 and Test Run Config Data 139 and may use such data to configure and control materials test performance on Materials Test Machine 140 and its Materials Test Devices 142B-J.

Alternatively or additionally, Test Controller 130 may execute test-related functions on a dedicated digital logic, each of which is configured using instructions, gates, or logic to perform the functions during use or execution. ASIC (Application Specific Integrated Circuits)/FPGA (Field Programmable Gate Array) 133 is such a digital logic depicted as an example in FIG. 1B. In such an example, CPU 131 may receive Machine Config Data 137 and Test Run Config Data 139 and may use such data to program ASIC/FPGA 133 and configure Test Controller 130 and Materials Test Machine 140 for communication.

Machine Config Data 137 includes configurations for Test Controller 130 and/or Materials Test Machine 140 such that, after the configuration, Test Controller 130 may control Materials Test Machine 140 by issuing to and collecting signals from one or more of Test Devices 142B-J.

Test Config Data 139 includes information for configuring test(s) of sample material(s), in an embodiment. Test Controller 130 (e.g., CPU 131, ASIC/FPGA 133) is configured according to Test Config Data 139 and issues instructions in the form of the output signal(s) that will cause the execution of the test. The result data of the test may be collected by Test Controller 130 in the form of sensor data, as an example. The sensor data may be used by Test Controller 130 to modify the output signals that control the test. The sensor data may also be used by Materials Test Management System 120 for generating test reports.

Test controller 130 communicates with Materials Test Machine 140 to perform configuration(s), initiate and control materials test(s), and collect sensor data, in one or more embodiments. Test Controller 130 may communicate with Materials Test Devices 142_1-142_N (as depicted in FIG. 1A) or Materials Test Devices 142A-J (as depicted in FIG. 1B) of Materials Test Machine 140 using dedicated or shared communication channels. A communication channel with any materials test device may be an input channel, output channel, or a bidirectional input/output channel which can be configured using machine configuration data 137 prior to or during the administration of a materials test).

Communication of ASIC/FPGA 133 and/or CPU 131 with materials test devices of Materials Test Machine 140 may be performed with or without Interfacing Component(s) 135. Additionally or alternatively, Interfacing Component(s) 135, although depicted as part of Test Controller 130, may be part of Materials Test Machine 140. Non-limiting examples of Interfacing Component(s) 135 include a digital-to-analog converter (DAC) and an analog-to-digital converter (ADC).

Materials Test Machine 140, as depicted in FIG. 1B, contains any number of Actuator Device 142B, Sensor Device 142C, Safety Device 142D, Test Grip 142E, Pendant Device 142F, Camera Device 142G, Sample Identifier 142I, and/or Temperature Chamber 142J, in one or more embodiments.

Actuator Device 142B may be any type of motor that performs angular or linear motion. Even if Actuator Device 142B produces angular motion, Actuator Device 142B may be coupled to a sample material in a way that its angular motion is transferred into linear motion or vice versa. Non-limiting examples of actuator devices for destructive and non-destructive testing include servo-hydraulic, electro-mechanical, electromagnetic, ultrasound, and laser-based actuators. Actuator Device 142B may receive output signals from Test Controller 130 to produce a movement that affects a sample material according to a materials test.

Sensor Device 142C may be a sensor device that collects the measurements of the effects of a materials test or the measurements of the source(s) that produce the effects. For example, Sensor Device 142C may be a load cell sensor measuring the load force on a sample material. As another example, Sensor Device 142C may be an encoder coupled to Actuator Device 142B that measures the amount of generated movement.

Safety Device 142D causes a materials test to stop if a particular condition related to the safety of the materials test is detected, in an embodiment. Upon the detection, Safety Device 142D may send a signal to Test Controller 130 to abort the materials testing or may use Materials Test Machine 140's electro-mechanical interface to abort the materials testing itself.

Test Grip 142E is an electrical grip that holds the sample material for materials testing, in an embodiment. Test Grip 142E may be communicatively coupled to Test Controller 130, and Test Controller 130 may send command(s) to Test Grip 142E to grip the sample material or to release the sample material. In other embodiments, Test Grip 142E may be manual and/or may be manually controlled.

Pendant Device 142F is an input device for Test Controller 130, which may be programmed for initiating and stopping materials testing on sample material, among other actions, in an embodiment. Pendant Device 142F may be communicatively coupled to Test Controller 130 and may send/receive signals for controlling materials testing, such as the movement of an actuator.

Camera Device 142G is an audio-visual sensor device that may capture images (or series of images, e.g., video) and/or audio of a materials test and transmit such captured media data to Test Controller 130. Additionally, Camera Device 142G may generate, receive and/or transmit a sync signal to indicate time points of captured media data items (e.g., images) to synchronize with the materials test result data.

Gauge Meter 142H is a device for measuring the size of the specimen on which a materials test is performed by Materials Test Machine 140. Test Controller 130 receives the measurement(s) from Gauge Meter 142H and may use the measurements to calculate the results of the materials test.

Sample Identifier 142I is a device used to acquire information about the sample material. Non-limiting examples of Sample Identifier 142I include a barcode reader, a QR code reader, and/or an RF tag reader. Sample Identifier 142I may communicate the identifying information to Test Controller 130. Identifying information about the sample material may be used by Test Controller 130 to further configure the performance of the test to be particular to the identified sample material.

Temperature Chamber 142J is used to configure the ambient temperature in which the materials test is to be performed. Test Controller 130 may use Test Config Data 139 and/or input from a temperature sensor to send command(s) to Temperature Chamber 142J for lowering or raising the ambient temperature for the materials test. In an embodiment, the temperature sensor is part of Temperature Chamber 142J.

Continuing with FIG. 1A, Materials Test Management System 160 may additionally include Test Deployment System 112, Test Run System 114, and Test Analysis System 116, each of which includes Materials Test Platform 110 and may be part of one or more computer systems such as Remote Computer System 162. Remote Computer System 162 may further host Test Storage 164. A non-limiting example of Remote Computer System 162 may be a cloud workload running Test Deployment System 112, Test Run System 114, and/or Test Analysis System 116 and communicatively coupled with a data retrieval service hosting Test Storage 164. Other non-limiting examples of Remote Computer System 162 are an on-premise computing server or an edge computing device communicatively coupled to Test Controller 130 and running similar workloads.

In an embodiment, Materials Test Platform 110 of Test Deployment System 112 provides an interface for configuring Materials Test System 100. Materials Test Platform 120 may query an internal or external database using identifying information about any test device or a materials test machine, or a controller itself, requesting available configuration setting options thereof. Such database may be hosted by Test Storage 164 of Remote Computer System 162.

Materials Test Platform 110 receives setting values for configuring Materials Test Machine 140, Test Controller 130, and/or for communication channels thereof, in an embodiment. A user of Materials Test Platform 110 may interact with the user interface thereof to provide the corresponding setting values. The machine configuration data of Test Controller 130 may be based, at least in part, on the provided setting values. By applying such machine configuration data, Test Controller 130 is able to execute and control materials testing on Materials Test Machine 140 and collect the result data. A non-limiting example of machine configuration data is Machine Config Data 137 of FIG. 1B.

Additionally or alternatively, Materials Test Platform 110 of Test Deployment System 112 may be able to generate machine configuration data without being communicatively coupled to Test Controller 130 and/or Materials Test Machine 140. Materials Test Platform 110 may receive input from a user identifying test machines, test controllers, and/or communication channels between them regardless of whether any of those systems and components are communicatively coupled with Test Deployment System 112. Each generated machine configuration data may be stored in a separate machine configuration data object (e.g., a separate configuration file).

Additionally or alternatively, Materials Test Platform 110 of Test Deployment System 112 provides a user interface for configuring the runtime software of Materials Test Platform 110. Non-limiting examples of software configuration for Materials Test Platform 110 include configuring users, roles and privileges for configuring/running/analyzing test(s), licensing features of Materials Test Platform 110, and arrangement and layout for the user interface of Materials Test Platform 110 when executing a test. The generated software configuration may be stored together with other configuration data in the corresponding configuration data object or in a separate software configuration object (e.g., software configuration file).

Materials Test Platform 110 of Test Deployment System 112 provides a user interface for configuring one or more materials tests for executions. A non-limiting example of a configuration of materials test(s) is Test Config Data 139 of FIG. 1B. Such configuration for each materials test may be stored in a separate materials test data object (e.g., materials test file) and/or together with configuration data in the corresponding configuration data object.

In an embodiment, the configuration of tests is performed independent of features of the materials test machine and/or test controller that will perform the execution. In such an embodiment, the mapping of the test configuration to the features of Materials Test Machine 140 (and its Materials Test Devices 142_1-142_N) and Test Controller 130 may occur during the configuration for deployment of Materials Test Machine 140 at Test Deployment System 112, executing Materials Test Platform 110, and/or when the test run configuration data is loaded by Test Controller 130 for the execution of the test(s). For example, Test Controller 130 has loaded Test Run Config Data 139 based on Test Run Configuration Data 226

Materials Test Management System 120 further includes Test Run System 114 for executing materials tests configured by Test Deployment System 112, in an embodiment. Materials Test Platform 110 of Test Run System 114 may be configured according to software configuration data generated by Test Deployment System 112. Materials Test Platform 110 of Test Run System 114 is communicatively coupled through Network 150 to Test Controller 130.

Based on user input, Materials Test Platform 110 of Test Run System 114 sends instructions to Test Controller 130 over Network 150 to load particular machine and/or test configuration data, in an embodiment. Such machine and test configuration data have been generated by Test Deployment System 112 for Test Controller 130 and Materials Test Machine 140 using the techniques described herein.

Alternatively or additionally, Materials Test Platform 110 of Test Run System 114 may request Test Controller 130 to load configuration data for Test Controller 130 and Materials Test Machine 140 from Test Storage 164 of Remote Computer System 162.

Materials Test Platform 110 may provide a user interface for authentication and authorization of a user to perform a materials test according to the loaded software configuration. Upon success, Materials Test Platform 110 provides a user interface for the user to execute a configured materials test.

Test Analysis System 116 provides a user interface to perform analytics on test results, in an embodiment. The test results may be in the form of output sensor data from one or more sensor devices of Materials Test Platform 110. Test Controller 130 provides sensor data to Materials Test Platform 110 of Test Analysis System 116 to perform various analytics and generate test reports. Test Controller 130 or Materials Test Platform 110 may cause the output sensor data for a materials test to be stored in Test Storage 164 of Remote Computer System 162. Analytics performed by Materials Test Platform 110 of Test Analysis System 116 may be offloaded to Remote Computer System 162 for improved performance because Remote Computer System 162 has the additional computing power to process sensor data and generate complex reports.

For the purpose of explanation, FIG. 1A and FIG. 1B depict a limited number of each component; however, various embodiments may include any number of such components.

Machine Configuration Data

Figure 2:
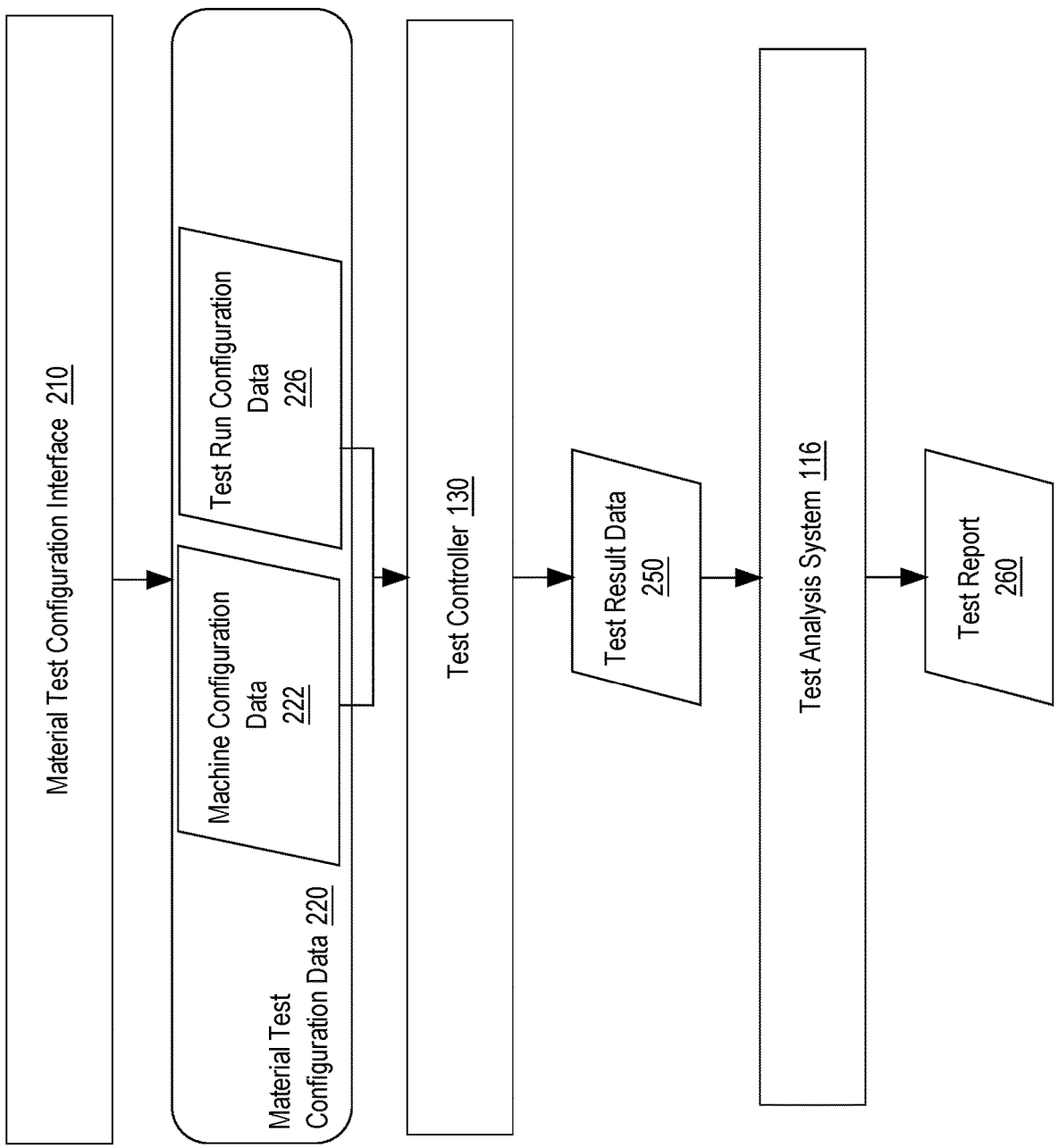
FIG. 2 is a block diagram that depicts the data flow of configuration data, in an embodiment.

FIG. 2 is a block diagram that depicts the data flow of configuration data, in an embodiment. Materials test configuration interface 210 provides an interface for collecting configuration information from a user. In an embodiment, configuration interface 210 provides a user interface for a machine testing platform for generating (and/or loading existing) machine configuration data 222 as part of materials test configuration data 220. Through the user interface 210, MTP 110 receives user input to generate/update machine configuration data 222. At the time of the generation or update, machine configuration data 222 may not yet be loaded into a test controller (unlike Machine Config Data 137). Additionally, no connection may exist between MTP 110 receiving user input and generating configuration data and any test controller for which the configuration is being generated. Rather, the machine configuration data 222 may be generated based on the user input selecting various configuration value settings for particular controller type(s) of test controller, material test machine and/or materials test device(s) thereof.

The term "controller type" refers to a particular set of capabilities of the test controller that may be indicated by a model name/number or other indication. The controller types available for selection for configuration may be based on a pre-configured set, thereby not requiring any connection with Test Controller 130. In an embodiment, the selection of a controller type may modify the available settings and/or possible setting values for the machine configuration data 222.

Figure 3:
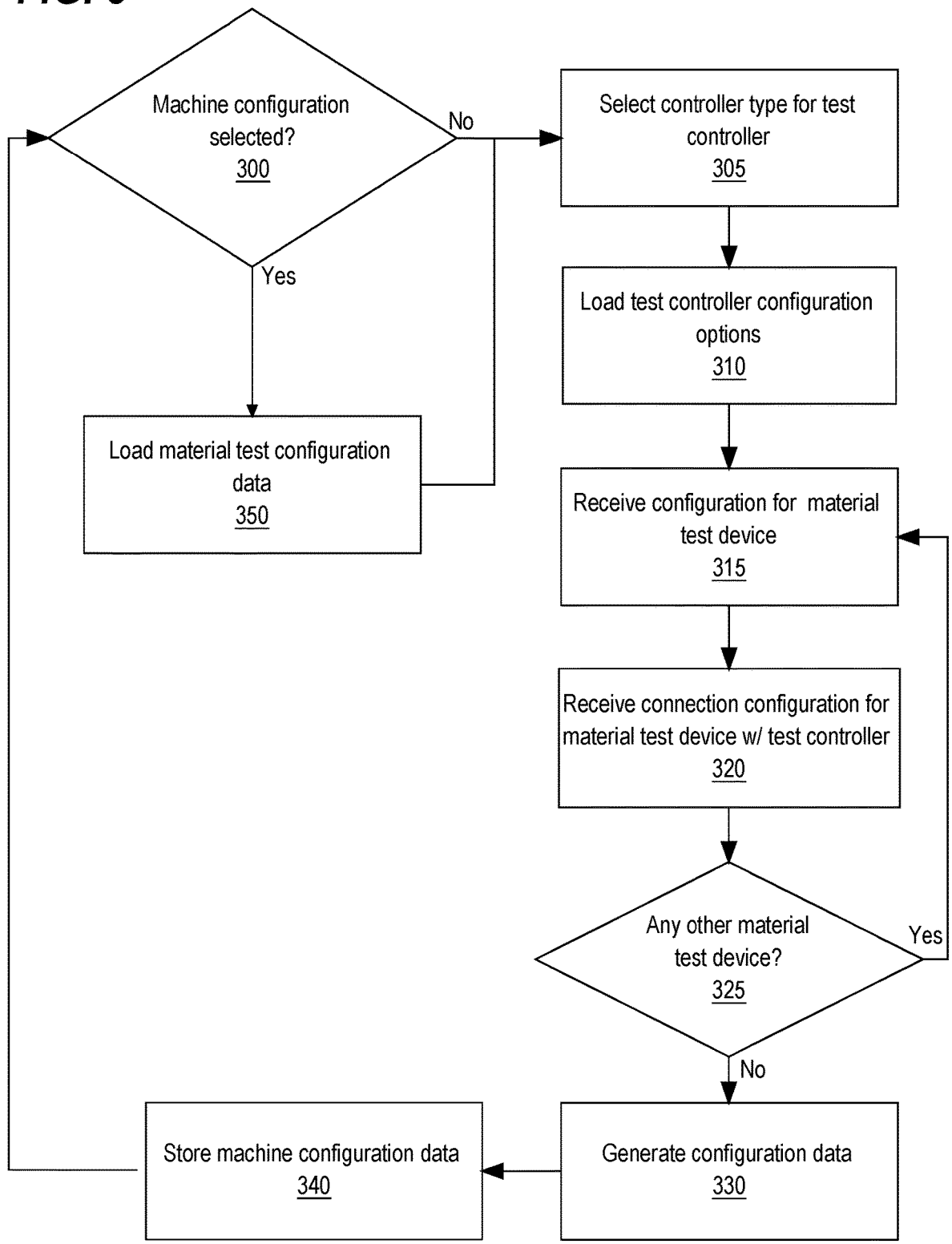
FIG. 3 is a block diagram that depicts a process of generating machine configuration data, according to one or more embodiments.

FIG. 3 is a block diagram that depicts a process of generating Machine Configuration Data 222, according to one or more embodiments. At step 300, MTP 110 may receive user input either to load an existing machine configuration data or to generate a new one. If, at step 300, no machine configuration data exists or has been indicated by the user input, the process proceeds to step 305. At step 305, MTP 110 provides controller type values for selection, in an embodiment. The controller type values may be based on the supported controller type(s) by MTP 110. In such embodiment, MTP 110 receives a setting value corresponding to a particular controller type. Alternatively, MTP 110 may discover controller(s) and their respective controller type, presenting the controller types for selection. Yet in another alternative embodiment, MTP 110 may present a user interface to configure the controller type, e.g., by providing user input for a number of channels, their types and other properties of a controller.

At step 310, MTP 110 determines which setting and settings values may be available for generating Machine Configuration Data 122. For example, upon receipt of the controller type selection, MTP 110 may load the configuration of the user interface that corresponds to the selected controller type. Such a user interface may include a subset of machine configuration settings and setting values that are otherwise available for configuration.

For example, one controller type may have 8 bidirectional channels for communication with Test Machine 140, while another controller type may have 16. Accordingly, if the latter is selected, the user interface for channel configuration lists 16 possible channels for driving actuators and collecting data from sensor(s) among other materials test devices to interface with. On the other hand, if the former controller type is selected, then MTP 110 displays only 8 such channels on the channel configuration user interface to receive user input for selecting interfacing materials test devices for the channels.

As another example, the support of a USB interface, and therefore a USB camera, may depend on the controller type.

Accordingly, the configuration settings for the USB camera may be present or absent for user input based on the controller type.

Configuration Dependency

At step 315, MTP 110 receives a user input for configuring a materials test device. The configuration setting(s) and corresponding setting values for the materials test device may depend on the selected controller type and/or or another materials test device settings from which the materials test device settings depend.

Figure 4:
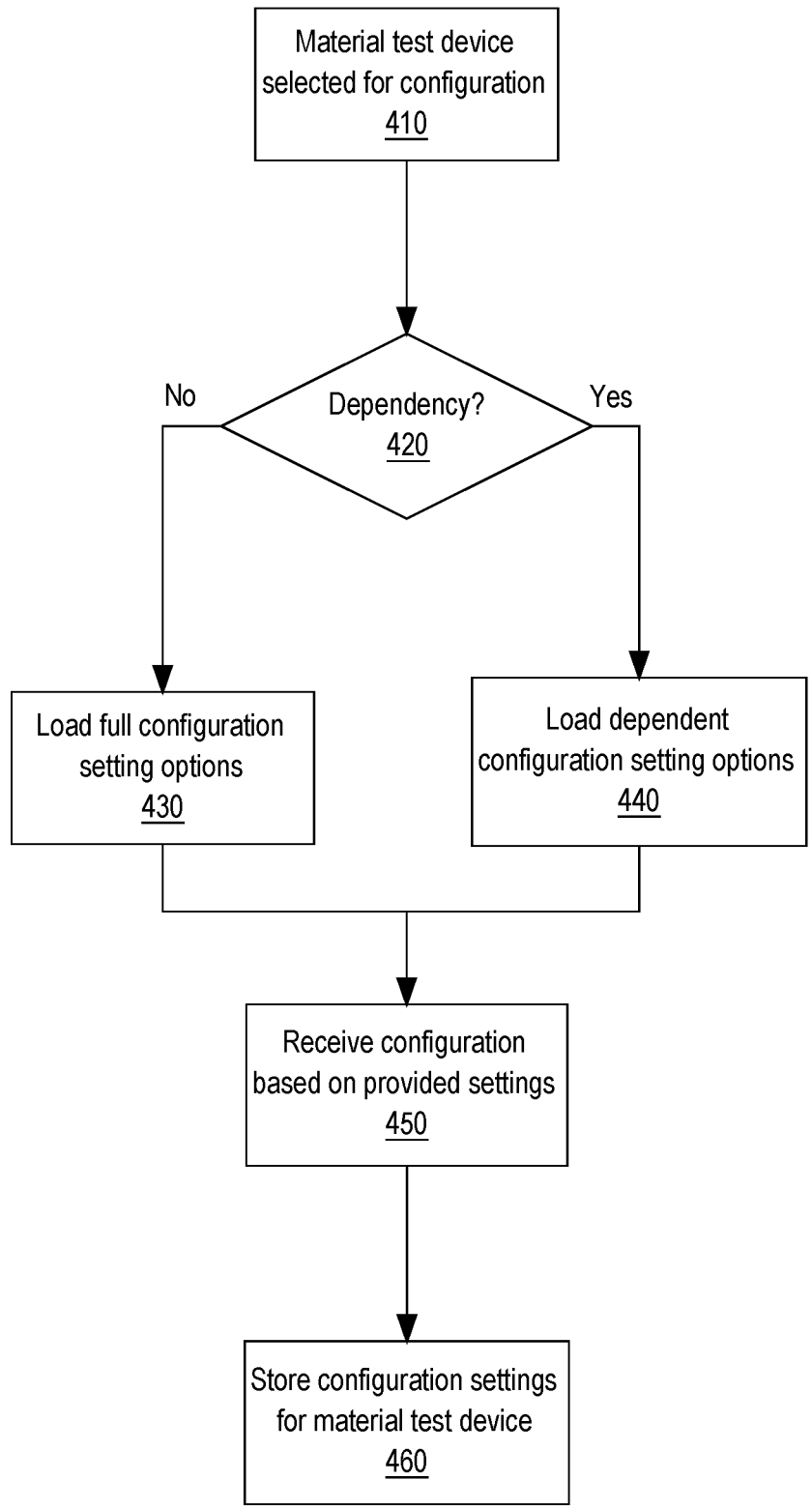
FIG. 4 is a block diagram that depicts a process for determining the dependency between materials test device configurations, in an embodiment.

FIG. 4 is a block diagram that depicts a process for determining the dependency between materials test device configurations, in an embodiment. At step 410, a materials test device is selected for configuration. The selection of the materials test device may be based on a) user input selecting the materials test device for configuration, b) in response to receiving the user input for the configuration of the controller (e.g., controller type) or c) in response to receiving the user input for configuration of another, previous, materials test device.

At step 420, MTP 110 determines whether the selected materials test device configuration has a dependency on the previous materials test device and/or controller configuration. If at step 420, MTP 110 determines that no dependency exists, at step 430, MTP 110 loads full configuration setting options. On the other hand, if at step 420, MTP 110 determines that one or more dependencies exist, MTP 110 loads the dependent configuration setting options based on the determined dependency.

In an embodiment, MTP 110 retrieves the configuration policy data for the selected materials test device to determine on which configuration settings and setting values of another materials test device and/or controller configuration, the selected materials device has configuration dependency. For example, the configuration dependency may limit the available configuration setting values for the selected materials test device to a particular subset of such values, or limit the configuration settings for the selected materials test device to a particular subset of such configuration settings.

At step 440, based on determining one or more dependencies for the materials test device configuration, MTP 110 loads the dependent configuration setting and/or configuration setting values. In one embodiment, the user interface of MTP 110 may display the configuration for the selected materials test device based on or in response to receiving the user input of the previously configured materials test device or controller type. The MTP 110 may determine to display only a subset of configuration settings or setting values are only available to configure the configuration setting of the materials test device.

For example, the setting value(s) for controlling an actuator (actuator 142B) may depend on the configuration of the controller type and its channel interfaces. In particular, as an example, an output channel of MTS 100 may be configured to interface with an actuator. MTP 110 may support a digital, analog, stepper motor driver and/or pulse-width-modulation interfaces as configuration setting values for an actuator. The configuration of an actuator in the machine configuration setting of MTP 110 may have at least the above-mentioned channel interface types available for the actuator. When a particular controller type is selected for configuring Test Controller 130 of Materials Test System 100, which fails to support a stepper motor, the stepper motor drive channel setting value may not be any longer be available for configuring actuator 142B. Accordingly, the actuator configuration interface would exclude any settings or setting values associated with the stepper motor driver.

As another example, MTP 110 may include the configuration of measurement units for a materials test machine. Only after the configuration of the measurement units for the materials test machine is received, MTP 110 may provide a configuration setting for the sensor device (e.g., to select which measurement unit the sensor device is collecting its sensor data in).

Continuing, with FIG. 4, at step 450, MTP 110 may receive user input for configuring the configuration setting based on the provided settings and setting values by MTP 110 according to the previous steps. MTP 110 may receive one or more setting values for each configuration setting for the selected materials test device and store those as the received configuration for the selected materials test device at step 460, thereby generating/updating Machine Configuration Data 122.

In an embodiment, multiple types of MTMs may be configured by MTP 110 using the steps discussed above to generate separate machine configuration data instances. Additionally or alternatively, a single machine configuration data instance may be used for multiple types of MTMs. In such an embodiment, during the deployment of the machine configuration data, additional configuration may be performed on MTP 110 to update the configuration to match the different types of MTM. For example, if the new MTM has an additional materials test device, MTP 110 may provide a user interface to update the settings to configure the additional materials test device during the deployment or beforehand.

Materials Test Device Interface with Test Controller

In an embodiment, MTP 110 provides a user interface for configuring channels for communication of the materials test devices, such as communication channels between Materials Test Devices 142_1 . . . 142_N of Materials test Machine 140 and Test Controller 130 of Materials Test Management System 160.

Continuing with FIG. 3, at step 320, a number of channels are presented for configuration. Each channel is of a particular type, and materials test devices may be configured to communicate with Test Controller 130 over such channel type. The configuration of the channel(s) may cause particular channel-based dependencies in materials test device configuration. MTP 110 may determine such dependencies based on the configuration policy data for the channel(s), controller type and/or material device(s) being interfaced.

For example, the number and types of channels presented for configuration depend on the controller type selected at step 305. Additionally or alternatively, the type of channel available for configuration for a materials test device may depend on the type of materials test device.

An actuator materials test device, such as Actuator Device 142B, may be configured to interface over output or bidirectional channel type but not for any of the input channels. Additionally, whether a step motor driver output channel is available for selection may depend on the controller type supporting such a channel. Accordingly, for the actuator interface configuration setting, a subset of configuration setting values are excluded both based on the controller type and the fact that the actuator is the materials test device being configured. On the other hand, for a sensor device, such as Sensor Device 142C, the sensor interface configuration setting may exclude solely output type channel setting values. In these examples, output and input are considered from the controller's perspective.

In an embodiment, based on the configuration policy data, MTP 110 may determine which configuration settings to provide for configuring a material device or whether or not to provide particular configuration setting(s). The configuration policy data may indicate that such a determination for a configuration setting may be based on one or more channel configuration settings. For example, whether a bridge type configuration setting for a sensor is available (and the number of setting values for this configuration) may depend on whether the selected controller type supports a Wheatstone Bridge type channel and whether this channel is configured to be interfacing with the sensor device. Furthermore, based on the controller type, the sensor may support the bridge type setting values to have a full bridge, half-bridge, quarter bridge or any other combination of such setting values. Therefore, for a particular controller type, the sensor device may only have a subset of these setting values supported.

Continuing with FIG. 3, at step 320, MTP 110 receives connection configuration for a materials test device providing configuration settings for interfacing the material device with Test Controller 130. When these configuration settings are applied/deployed by MTP 110, Test Controller 130 may communicate with the materials test device by receiving materials test data and/or transmitting materials test commands using Interface Components 135.

At step 325, the process continues for other materials test devices. For example, in FIG. 1B, apart from Actuator Device 142B and Sensor Device 142C, Safety Device 142D, Test Grip 142E, Pendant Device 142F, Camera Device 142G, Sample Identifier 142I and Temperature Chamber 142J may be configured by receiving the corresponding user input for the channel configuration. One or more of these device configurations may depend on previously received user input for another materials test device configuration or the configuration of Test Controller 130.

At step 330, based on received configuration setting values for configuration settings for materials test devices and the test controller, MTP 110 generates configuration data, such as Machine Configuration Data 122. The generated configuration data at step 340 may be stored on any storage device accessible during the deployment of the materials test system to perform the materials test.

In an embodiment, the previously configured settings may be updated by MTP 110. Continuing with FIG. 3, if at step 300, MTP 110 receives input indicating existing machine configuration data, at step 350, MTP 110 loads the configuration settings and corresponding values of the indicated machine config data. Thereby, MTP 110 provides a user with an interface to update the configuration setting values of an existing machine configuration data, as discussed in steps 305-325.

Materials Test Run Configuration

Continuing with FIG. 2, MTP 110 may provide Material Test Configuration Interface to configure Test Run Configuration Data 226 for a test run on a specimen using Materials Test Machine 140. In one embodiment, Test Run Configuration Data 226 may be generated/updated without any connectivity of MTP 110 with Materials Test Machine 140 or Test Controller 130, on which the configured materials test is to be performed. In another embodiment, the configuration of the test run may be performed while connectively coupled to Test Controller 130. In such an embodiment, one or more configurations from the machine config setting data of Test Controller 130 (and/or Materials Test Machine 140) may cause a subset of test run configuration setting values to be available for the configuration.

Among various test run configuration settings, MTP 110 may receive user input for configuring output to actuators, such as Actuator Device 142B, and other materials test devices. The configuration may select the type of actuator to use and the channel to be used for the output signal to the actuator.

Additionally, the test run configuration may include conditional configuration based on the input data received from the sensor devices of Materials Test Machine 140. For example, MTP 110 may receive configuration setting value(s) that identify the control channel(s) for Actuator Device 142B and the feedback channel for receiving sensor data from Sensor Device 142C for controlling Actuator Device 142B. Such test run configuration settings may additionally identify the signal type generated and received by the respective channels for the control of Actuator Device 142B. The test run configuration may include a particular behavior setting for output based on the receipt of particular value(s) (or functions thereof) of the feedback channel sensor data.

Additionally or alternatively, as part of generating/updating Test Configuration Data 226, MTP 110 may receive user input configuring the ambient environment for the test run configuration. For example, configuration setting value(s) for configuring Temperature Chamber 142J to one or more temperatures which may be applied to the specimen during respective stages of the test run, may be received and applied.

MTP 110 may receive user input configuring the collections of sensor data from the sensor device(s) during a test run. Such configuration may include selecting one or more of the configured sensor devices of Materials Test Machine 140 to record/display the sensor data during the test run. Additionally or alternatively, MTP 110 may receive user input for configuring the processing of the sensor data during the test run. For example, MTP 110 may receive test configuration to calculate the rate of force application on the specimen based on the receipt of data from the load sensor measuring the load on the specimen at particular time intervals.

In an embodiment, based on the user input received for the test run configuration, MTP 110 generates test run configuration data, such as Test Configuration Data 226. During deployment, MTP 110 may further update Test Run Configuration Data 226 based on the configuration in the machine configuration data for Materials Test Machine 140 to adapt the test run(s) for a particular materials test machine. The generated test run configuration data may be stored locally on Test Deployment System 112/Test Run System 114 or remotely in Test Storage 164 on Remote Computer System 162.

In an embodiment, multiple test run configuration data may be generated and stored. Each test run configuration data may be associated with the corresponding materials test machine, such as Materials Test Machine 140, test controller type, specimen type and/or a particular type of test (such as those required by various industry standards).

Cloud-Based Configuration

Steps for configuring materials test machine, as described in the example embodiment of FIGS. 3 and 4, may be performed on a cloud-based computer system, an example of which is described in the "Cloud Computing" section.

MTP 110 is executed on Remote Computer System 162, and the generated instances of configuration data may be stored in and loaded from Test Storage 164.

When deploying Machine Configuration Data 222 and/or Test Run Configuration Data 226 to Test Controller 130, Test Deployment System 112 may download the executable(s) of MTP 110 from Remote Computer System 162. The executables may include the generated configuration setting data, or the generated configuration setting(s) may be downloaded during the execution of the executables. Once the executables are executed on Test Deployment System 112, MTP 110 may receive additional user input for loading and/or further configuring machine configuration for a materials test management system.

Deploying Configuration Settings

Continuing with FIG. 2, Materials Test Configuration Data 220, including Machine Configuration Data 222 and Test Run Configuration Data 226, is deployed to Test Controller 130. Such a deployment generates corresponding Machine Config Data 137 and Test Run Config 139 within Test Controller 130 to configure and perform test runs on Materials Test Machine 140.

To select the controller to configure, MTP 110 may display multiple test controllers to receive user input indicating the test controller for which to load the configuration setting data (and thereby configure the coupled materials test machine).

In an embodiment, when provisioning a materials test machine, such as materials test machine 140, MTP 110 may discover test controller(s) over the network. When discovered, MTP 110 may receive from the test controller(s) the controller types and other identifying information to display about each discovered test controller. For example, in FIG. 1A, MTP 110 through Network 150 may send network packet(s) to discover Test Controller 130. Once discovered, MTP 110 may receive information about Test Controller 130, including the controller type.

From discovered/available test controllers, MTP 110 may receive user input indicating the test controller (and thus, the materials test machine(s) of the test controller) to configure with configuration setting data at step 510.

Similarly, multiple configuration setting data may exist for the same test controller. Any of the multiple configuration setting data generated by MTP 110 may be deployed on the identified test controller, in such an embodiment. Additionally or alternatively, MPT 110 may determine which configuration setting data is compatible with the test controller based on determining the controller type (either during the discovery or by a separate request to the test controller).

Figure 5:
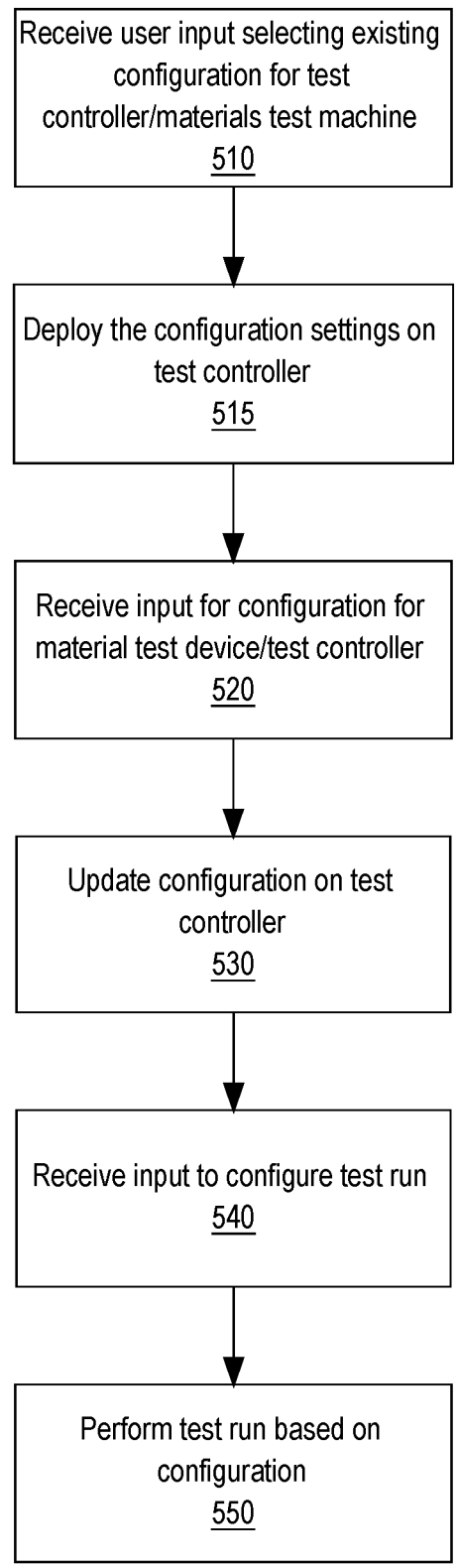
FIG. 5 is a block diagram that depicts a process for deploying materials test configuration setting data to a test controller to perform a materials test, in an embodiment.

FIG. 5 is a block diagram that depicts a process for deploying materials test configuration setting data to a test controller to perform a materials test, in an embodiment. At step 510, MTP 110 may receive a user input to deploy the configuration data on the selected test controller, thereby configuring the materials test system. For example, the user input may indicate Machine Configuration Data 222 for Test Controller 130. Machine Configuration Data 222 may be a template for the particular controller type of Test Controller 130 and/or the particular materials test machine type of Materials Test Machine 140. Accordingly, multiple test controllers may re-use the same machine configuration data for deploying the machine configuration settings onto the test controller and/or materials test machine.

In response to receiving the indication of machine configuration data, MTP 110 uploads the machine configuration setting data onto the test controller of the materials test management system over the network at step 515. For example, when Test Controller 130 is selected for the configuration, Machine Configuration Data 220 data may be uploaded to Test Controller 130 over Network 150.

Test Controller 130 deploys the uploaded settings of Machine Configuration Data 222, updating the settings for materials test device(s) 142_1 to 142_N of coupled Materials Test Machine 140 and the interfaces thereof as an example.

In an embodiment, MTP 110 provides the interface for further configuring the materials test system while the test controller is coupled to the materials test machine. The configuration data loaded may have configurations that do not match the materials test device(s) and/or types thereof. For example, MTP 110 loads configuration setting data onto Test Controller 130 that contains a Wheatstone-type sensor setting having the quarter bridge configured for the interface. However, Test Controller 130/Materials Test Machine 140 may not support this interface type. The configuration data may still be loaded successfully for other settings, but for this interface setting, the setting may not be applied. MTP 110 may display no setting value, thereby requesting user input for a new setting value.

At step 520, MTP 110 may receive user input modifying/adding configuration settings of materials test device(s) and/or the test controller. As discussed in the example above, the deployment of configuration setting data may generate a mismatch between the actual capabilities of the actual test controller/materials test device(s) of the materials test machine and the configuration setting values assigned in the deployed configuration setting data. Accordingly, MTP 110 may provide an interface for soliciting user input to correct the mismatch.

Certain configuration settings may be mismatched or missing because configuring such machine configuration setting(s) may require Test Controller 130 to be coupled to Test Deployment System 112. Thus, the machine config setting data that was generated without being communicatively coupled to Test Controller 130 may have incorrect or missing setting values. For example, a sensor device configuration may be configured before the deployment, but the sensor device may need to be calibrated. Thus, MTP 110 may provide an interface to calibrate the sensor device only when Test Controller 130 is communicatively coupled to the sensor device of Materials Test Machine 140. In such an example, a known measurement is provided to the sensor device, while Test Controller 130 collects the sensor input data for the known measurement. The setting value(s) are then received that configure the sensor device to ensure that the output sensor data of the sensor device correspond to the provided known measurement of the calibration.

Accordingly, at step 520, MTP 110 may receive a user input indicating new setting value(s) to update, add and/or correct configuration setting(s), thereby configuring the materials test machine/test controller after the deployment was performed at step 515.

Additional examples include a missing configuration in the deployed configuration setting data. For example, no configuration may exist for a particular materials test device or a feature thereof in the deployed configuration setting data.

Additionally or alternatively, even if the configuration setting data is successfully deployed and no mismatch has occurred, MTP 110 may still provide an interface to update the existing setting values for configuration settings of the materials test device(s) and/or the test controller.

At step 530, the configuration setting value(s) are updated for the configuration based on the user input and/or discovered setting values from the connected Test Controller 130 and/or Materials Test Machine 140. After step 530, MTM 140 and Test Controller 130 are configured, and materials test(s) may be performed.

In an embodiment, MTP 110 displays a list of available test run configurations, each configuration corresponding to a separately configured test run, stored locally on Test Deployment System 112/Test Run System 114 or remotely in Test Storage 164 on Remote Computer System 162. MTP 110 may retrieve metadata about each test run configuration, such as the compatible controller type, materials test machine, and supported specimen type(s), among other associated features. MTP 110 may display such metadata to aid the selection of the test run configuration.

MTP 110 receives user input by selecting the particular test run configuration setting data to configure the corresponding test run, e.g., Test Run Configuration Data 226. Test Run Configuration Data 226 is loaded into Test Controller 130 for the performance of the materials test run, if not already present there. Test Config Data 139 is an example of the loaded configuration setting data.

Additionally, at step 540, once the particular materials test configuration is loaded into Test Controller 130, MTP 110 may provide a user interface for updating the test configuration, thereby updating Test Run Configuration Data 226 and/or corresponding Test Config Data 139.

At step 550, MTP 110 may receive user input to perform the configured materials test run by Test Controller 130 on Materials Test Machine 140 on the specimen of Materials Test Machine 140.

Continuing with FIG. 2, Test Controller 130 may generate Test Result Data 250 from the sensor data received during the material test run performance. Test Result Data 250 may be stored locally or uploaded to Remote Computer System 162. Additionally, Test Result Data 250 may be cryptographically signed to prevent any tempering with Test Result Data 250.

In an embodiment, Test Analysis System 116 may analyze Test Result Data 250 to generate Test Report 260. Test Report 260 may be in the format configured for acceptance by industry standard bodies. For example, MTP 110 may be configured with one or more test report templates. MTP 110 may format Test Report 260 with a particular test report templates as configured for the materials test performed. Additionally, Test Report 260 may be cryptographically signed to prevent any tempering with Test Report 260.

Materials Test Software Configuration

The user input requesting the performance of a materials test may require authentication and/or authorization. In an embodiment, MTS 100 may be configured for authentication and authorization for tasks requested to be performed by MTP 110. In such an embodiment, MTP 110 provides a user interface for user input to generate a user, user group, user role, and user activities, among other access-related configurations. Such configuration(s) may be pre-configured for an organization and thereby loaded by MTP 110 as the current user/software configuration setting.

Figure 6:
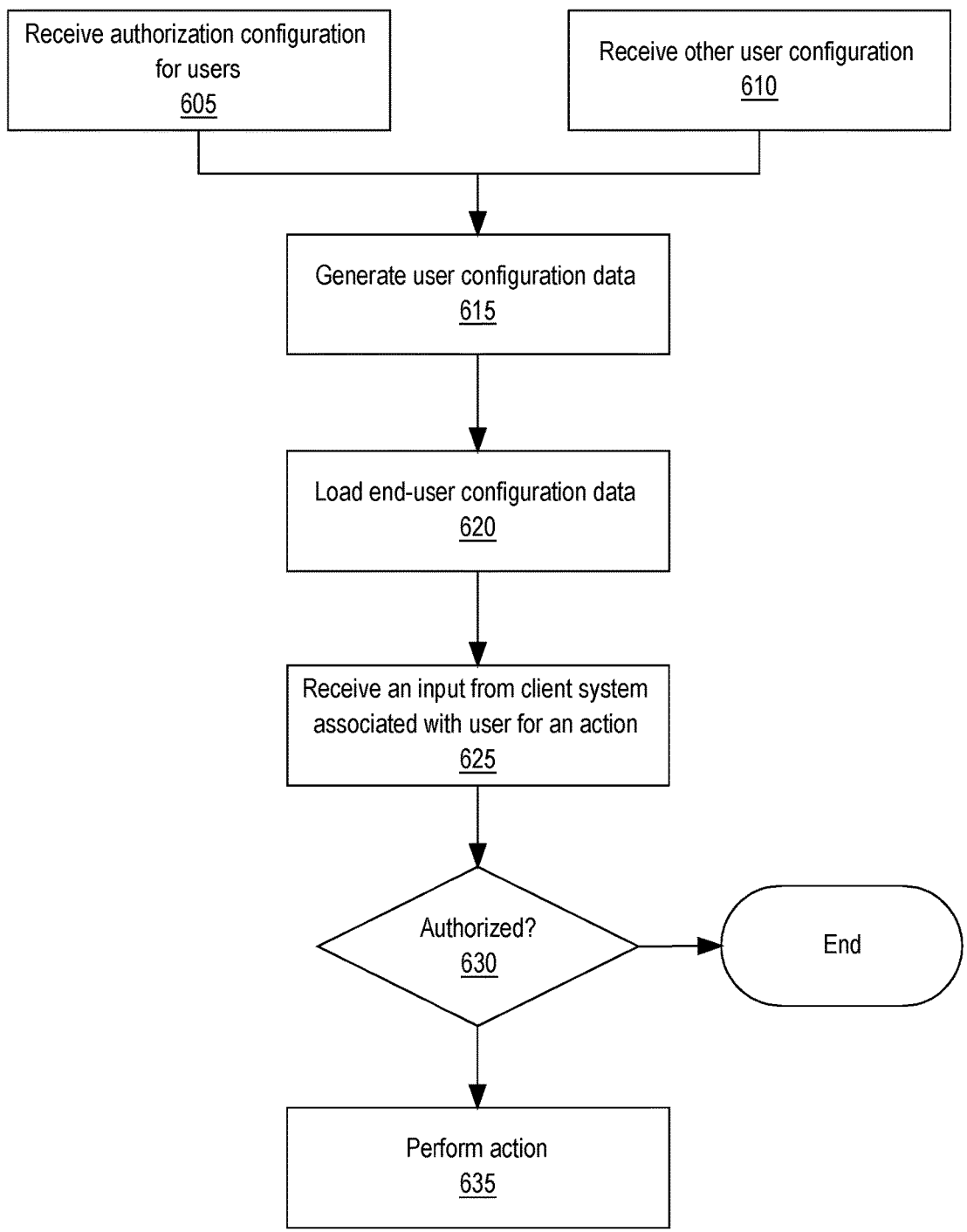
FIG. 6 is a block diagram depicting a process for performing software configuration, in one or more embodiments.

FIG. 6 is a block diagram depicting a process for performing user authorization and other software configurations, in one or more embodiments. At step 605, MTP 110 receives one or more user inputs to configuration authorization for users. Such input may include creating new users, security policies, and other user authorization settings. The authorization settings may determine which users may perform a materials test, configure materials test, perform maintenance (updates) and other activities. Conversely, the authorization configuration may deny users the right to perform any of such activities.

At step 610, additional user configuration may be received. Such configuration may include end-user information such as title, company and contact information. Other user configurations may also include licensing information for limiting the configuration and performance of the materials test according to the acquired active license.

At step 615, based on the user input received, user configuration data is generated by MTP 110. The user configuration data may be exported (as a configuration file on another storage data format) and imported into another materials test system.

In an embodiment, when Materials Test Machine 140 is provisioned for use, MTP 110 may load the user configuration data to enable user authorization features for MTS 100 at step 620. MTP 110 may load the configuration settings as locally configured or by importing an external user configuration setting data. Such external user configuration setting data may be stored in Test Storage 164 on Remote Computer System 162, as one example.

The loading of the user configuration setting by MTP 110 may include configuring third-party authentication/authorization services or directory services such as LDAP or Active Directory®. Upon loading of user configuration setting data, MTP 110 may control the user access based on the user configuration setting data. Once loaded, any user may have to first authenticate with MTP 110 before proceeding to request any action.

At step 625, MTP 110 may receive a request for action from the user. Based on the action requested, MTP 110 may further authorize or deny the user request for the action. Such action may be a request to modify machine configuration setting(s), materials test configuration setting(s) and/or the user configuration setting(s). Additionally or alternatively, the action may be related to starting or stopping an already configured materials test. If, at step 630, MTP 110 determines that the user is authorized for the corresponding action, MTP 110 performs the action. For example, MTP 110, upon determining that the user is authorized to perform a materials test, may initiate the materials test with MTM 140, at step 635.

Software Overview

Figure 7:
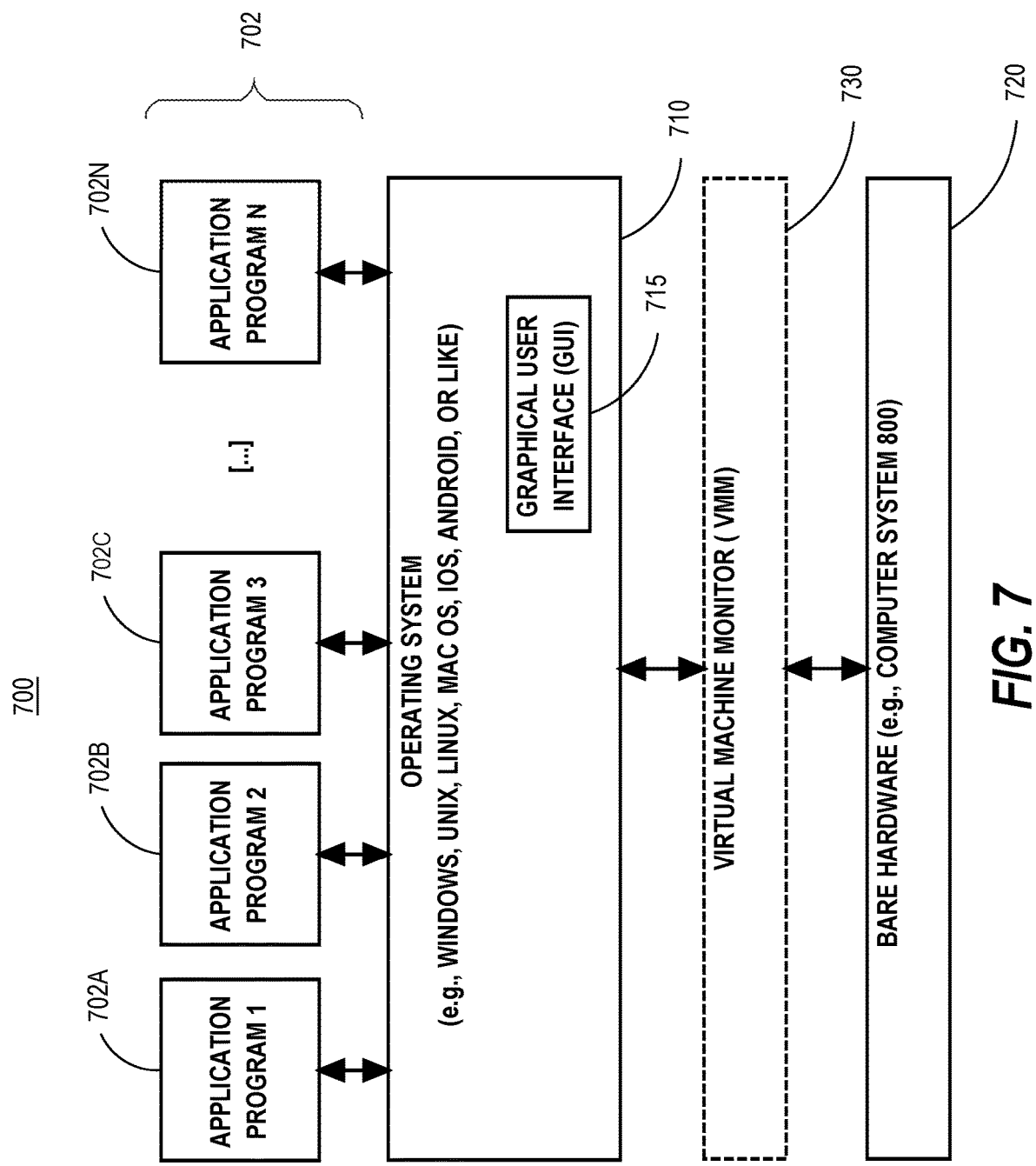
FIG. 7 is a block diagram of a basic software system, in one or more embodiments.
Figure 8:
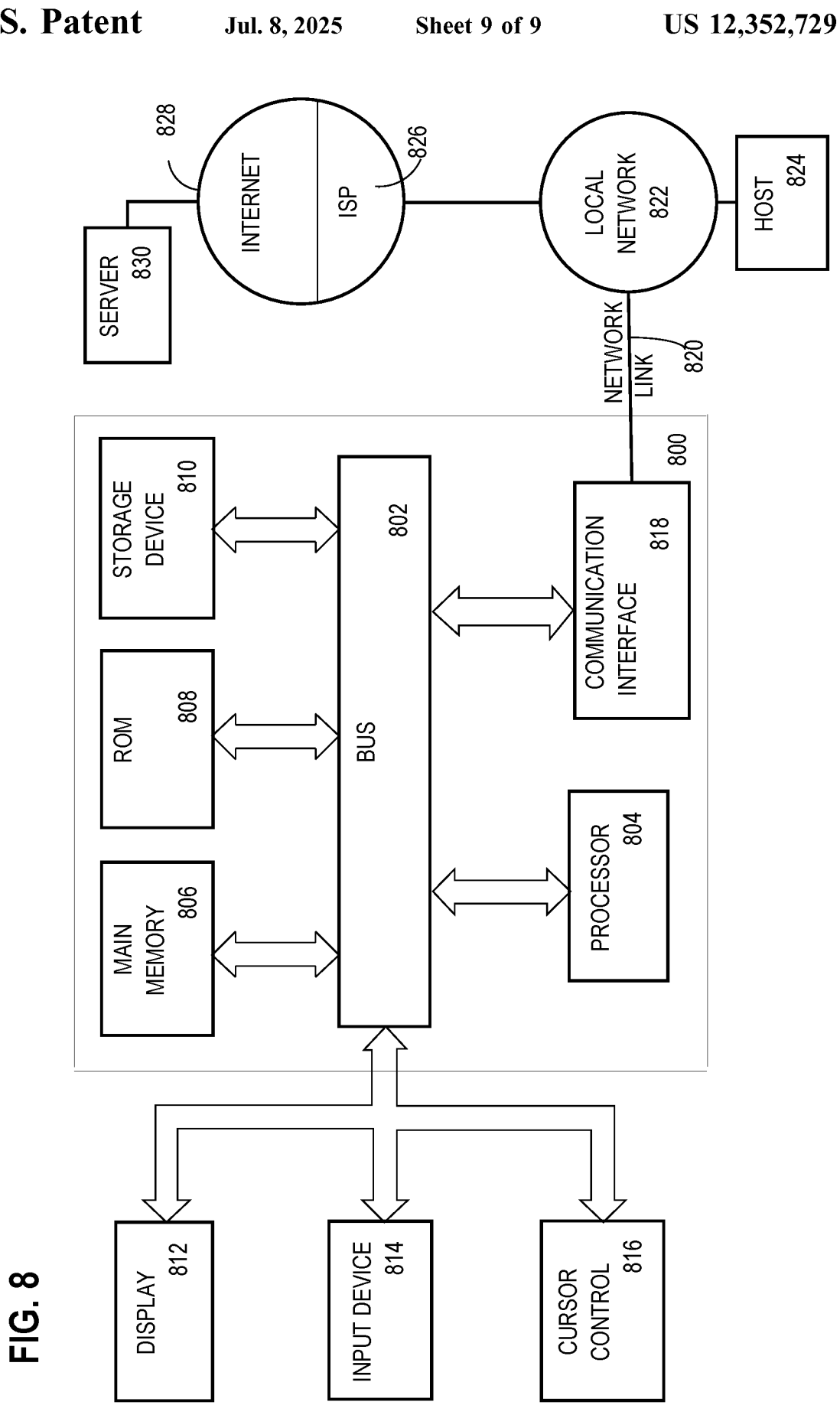
FIG. 8 is a block diagram that illustrates a computer system upon which an embodiment of the invention may be implemented.

FIG. 7 is a block diagram of a basic software system 700 that may be employed for controlling the operation of computing system 800 of FIG. 8. Software system 700 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 800. Software system 700, which may be stored in system memory (RAM) 806 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs represented as 702A, 702B, 702C . . . 702N, may be "loaded" (e.g., transferred from fixed storage 810 into memory 806) for execution by the system 700. The applications or other software intended for use on computer system 800 may also be stored as a set of downloadable computer-executable instructions, for example, for downloading and installation from an Internet location (e.g., a Web server, an app store, or another online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability. Such clouds may be used in a single tenant configuration or a multi-tenant configuration.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the runtime execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Materials Test Platform as a Service (MTPaaS) in which consumers use a materials test platform that is running upon a cloud infrastructure, while a materials test platform provider manages or controls the underlying cloud infrastructure, applications, and servers, including one or more MTP instances. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or another dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read-only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal, and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826, in turn, provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
configuring, at a materials test deployment system, a materials test system to perform one or more materials tests on one or more sample materials, the materials test system comprising a test controller device and one or more materials test devices, wherein the test controller device is communicatively coupled to the one or more materials test devices, the configuring comprising, without the materials test deployment system being communicatively coupled with the test controller device and with the one or more materials test devices:
   wherein at least one materials test device of the one or more materials test devices is associated with a plurality of available configuration setting values,
   wherein the test controller device is associated with a plurality of test controller hardware device types,
   wherein each test controller hardware device type of the plurality of test controller hardware device types indicates capabilities of a controller device of said test controller hardware device type, including compatibility of the controller device of said test controller hardware device type with configuration of the one or more materials test devices,
   receiving input selecting a particular test controller hardware device type, from the plurality of test controller hardware device types, for the test controller device,
   based at least in part on receiving the input selecting the particular test controller hardware device type, from the plurality of test controller hardware device types, for the test controller device, determining a particular subset of the plurality of available configuration setting values possible for configuring the at least one materials test device,
   displaying, for the at least one materials test device, the particular subset of the plurality of available configuration setting values to configure the at least one materials test device,
   receiving input for configuring the at least one materials test device of the one or more materials test devices, the input for configuring comprising one or more values from the particular subset of the plurality of available configuration setting values that are available for configuring the at least one materials test device and that are based on the input selection of the particular test controller hardware device type, from the plurality of test controller hardware device types, for the test controller device, and
   generating configuration data based at least in part on the input for configuring the at least one materials test device of the one or more materials test devices and the input selecting the particular test controller hardware device type;
in response to receiving input to load the configuration data, loading the configuration data into the test controller device and thereby, at least in part, configuring the materials test system;
receiving input for performing at least one materials test of the one or more materials tests thereby causing performance of the at least one materials test by the test controller device.

2. The method of claim 1, further comprising:
collecting sensor data for the at least one materials test from one or more sensor devices of the materials test system;
based at least in part on the sensor data for the at least one materials test, generating test results for the at least one materials test.

3. The method of claim 2, further comprising:
uploading the test results to a remote computer system;
based at least in part on the test results of the at least one materials test, causing generation, by the remote computer system, a test report for the at least one materials test.

4. The method of claim 1, further comprising:
providing materials test platform as a service on a remote computer system at least by performing the configuring of the materials test system to perform the one or more materials tests on the one or more sample materials by the remote computer system.

5. The method of claim 1, wherein the materials test system comprises the one or more materials test devices which include one or more of: a sensor device, an actuator device, a safety device, a test grip, a pendant device, a camera device, a sample identifier, or a temperature chamber.

6. The method of claim 1,
wherein the input for configuring the at least one materials test device of the one or more materials test devices is input for a first configuration setting of the at least one materials test device,
wherein the method further comprises:
after loading the configuration data and based on the input for the first configuration setting, receiving input for a second configuration setting of the at least one materials test device, different from the first configuration setting.

7. The method of claim 6, wherein the input for the second configuration setting of the at least one materials test device includes a second input value from a plurality of second possible setting values that depends on the input for the first configuration setting of the at least one materials test device.

8. The method of claim 1, further comprising:
in response to receiving input for user configuration, configuring the materials test system with the user configuration;
wherein the input for performing the at least one materials test is associated with a user account of the user configuration of the materials test system.

9. The method of claim 1,
wherein the configuration data comprises a first configuration setting having a plurality of first available configuration setting values and a second configuration setting having a plurality of second available configuration setting values;
the method further comprising:
receiving input to configure the first configuration setting with a first value from the plurality of first available configuration setting values;
based on receiving the input to configure the first configuration setting, configuring the first configuration setting with the first value;
based on configuring the first configuration setting with the first value, providing a subset of the plurality of second available configuration setting values as valid values for configuring the second configuration setting.

10. The method of claim 9, wherein the first configuration setting is for unit configuration of the materials test system, and the second configuration setting is for a sensor device of the one or more materials test devices.

11. The method of claim 9, wherein the at least one materials test device is a first device; the first configuration setting is for the first device; and the second configuration setting is for a second materials test device of the one or more materials test devices.

12. The method of claim 9, wherein the second configuration setting is for the at least one materials test device.

13. The method of claim 1, wherein the materials test system comprises a camera device, which is communicatively coupled to the test controller device, the method further comprising:
capturing video data of the performance of the at least one materials test;
synchronizing, by the test controller device, the video data with results of the at least one materials test thereby generating video log that includes association of one or more captured video media of the video data with one or more of the results of the at least one materials test.

14. The method of claim 1,
wherein the materials test system comprises the one or more materials test devices which include a sensor device and an actuator device;
wherein the sensor device is communicatively coupled to the test controller device through a first communication channel and the actuator device is communicatively coupled to the test controller device through a second communication channel;
storing in the configuration data coupling information that indicates that the sensor device is communicatively coupled to the test controller device through the first communication channel and the actuator device is communicatively coupled to the test controller device through the second communication channel.

15. The method of claim 14, further comprising:
receiving input that indicates that the sensor device is communicatively coupled to the test controller device through the first communication channel and the actuator device is communicatively coupled to the test controller device through the second communication channel.

16. The method of claim 14, further comprising:
sending movement request data to the actuator device over the first communication channel;
receiving sensor data from the sensor device over the second communication channel.

17. The method of claim 1, further comprising
uploading the configuration data to a remote computer system;
in response to receiving input to load the configuration data into the materials test system, loading the configuration data by downloading the configuration data from the remote computer system.

18. The method of claim 1, further comprising:
based on input for configuring user configuration, generating user configuration data and uploading the user configuration data to a remote computer system;
in response to receiving input for configuring the materials test system with the user configuration, downloading the user configuration data from the remote computer system and configuring the materials test system with the user configuration;
wherein the input for performing at least one materials test is associated with a user account of the user configuration of the materials test system.

19. The method of claim 1, further comprising downloading from a remote computer system the one or more materials tests.

20. A system comprising one or more processors and one or more storage media storing one or more computer programs for execution by the one or more processors, the one or more computer programs configured to perform a method comprising:

configuring, at a materials test deployment system, a materials test system to perform one or more materials tests on one or more sample materials, the materials test system comprising a test controller device and one or more materials test devices, wherein the test controller device is communicatively coupled to the one or more materials test devices, the configuring comprising, without the materials test deployment system being communicatively coupled with the test controller device and with the one or more materials test devices:

wherein at least one materials test device of the one or more materials test devices is associated with a plurality of available configuration setting values, wherein the test controller device is associated with a plurality of test controller hardware device types, wherein each test controller hardware device type of the plurality of test controller hardware device types indicates capabilities of a controller device of said test controller hardware device type, including compatibility of the controller device of said test controller hardware device type with configuration of the one or more materials test devices, receiving input selecting a particular test controller hardware device type, from the plurality of test controller hardware device types, for the test controller device, based at least in part on receiving the input selecting the particular test controller hardware device type, from the plurality of test controller hardware device types, for the test controller device, determining a particular subset of the plurality of available configuration setting values possible for configuring the at least one materials test device, displaying, for the at least one materials test device, the particular subset of the plurality of available configuration setting values to configure the at least one materials test device, receiving input for configuring the at least one materials test device of the one or more materials test devices, the input for configuring comprising one or more values from the particular subset of the plurality of available configuration setting values that are available for configuring the at least one materials test device and that are based on the input selection of the particular test controller hardware device type, from the plurality of test controller hardware device types, for the test controller device, and generating configuration data based at least in part on the input for configuring the at least one materials test device of the one or more materials test devices and the input selecting the particular test controller hardware device type;

in response to receiving input to load the configuration data, loading the configuration data into the test controller device and thereby, at least in part, configuring the materials test system;

receiving input for performing at least one materials test of the one or more materials tests thereby causing performance of the at least one materials test by the test controller device.

* * * * *